May 17, 1932.  E. N. HESCOCK  1,858,825
CABLE REEL AND METAL LAGGING
Filed May 2, 1930    2 Sheets-Sheet 1
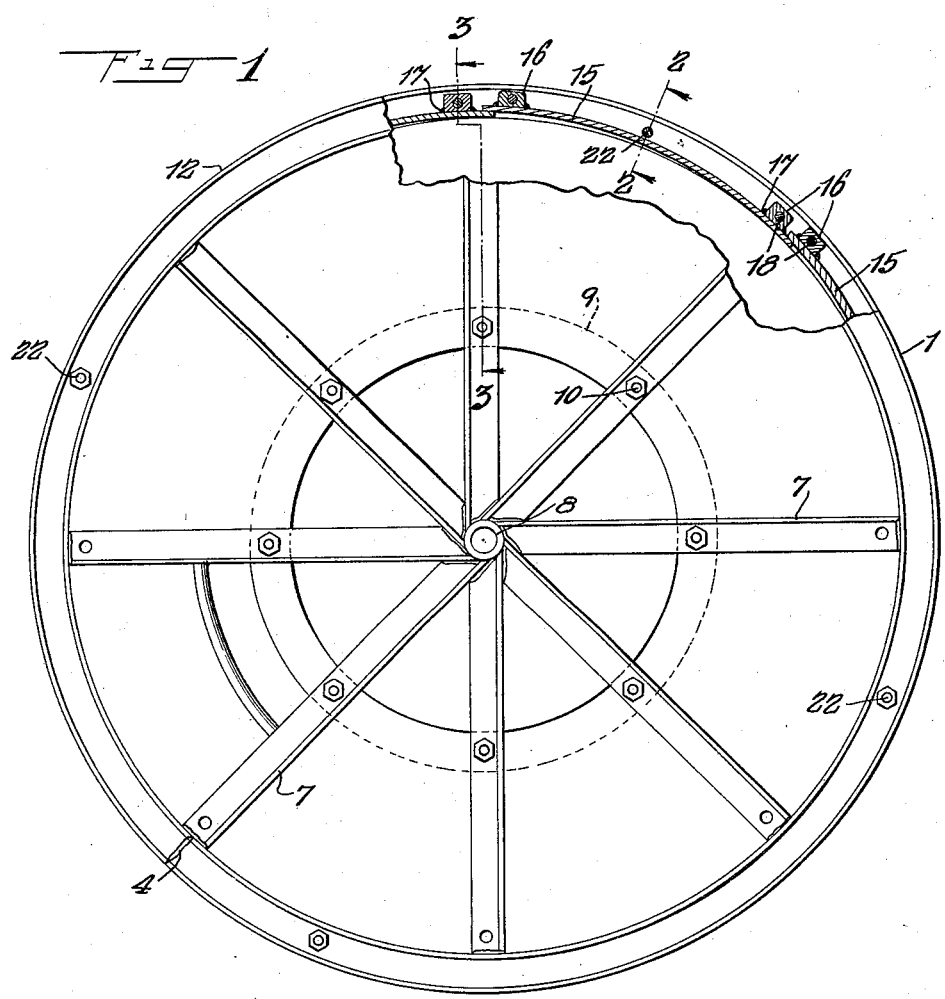
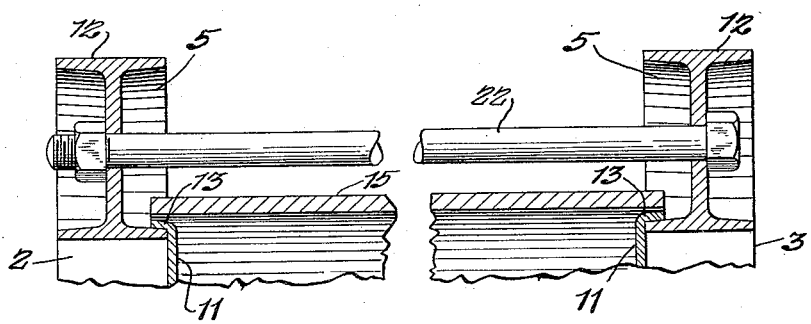
INVENTOR
Ethan N. Hescock
BY Charles Johnson
ATTORNEY May 17, 1932.  E. N. HESCOCK  1,858,825
CABLE REEL AND METAL LAGGING
Filed May 2, 1930   2 Sheets-Sheet 2
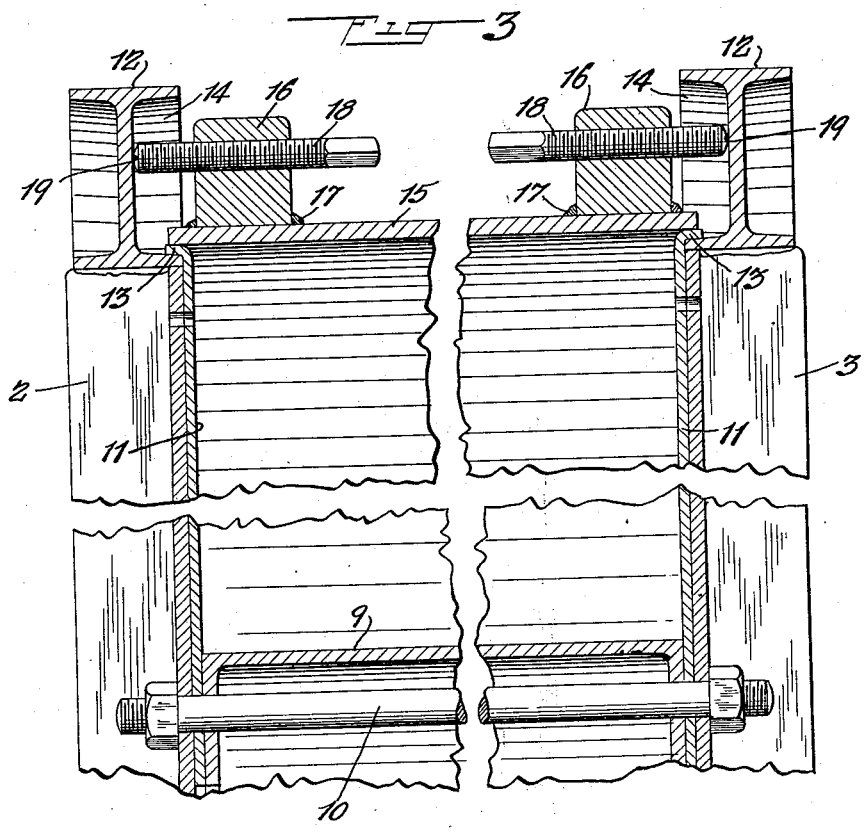
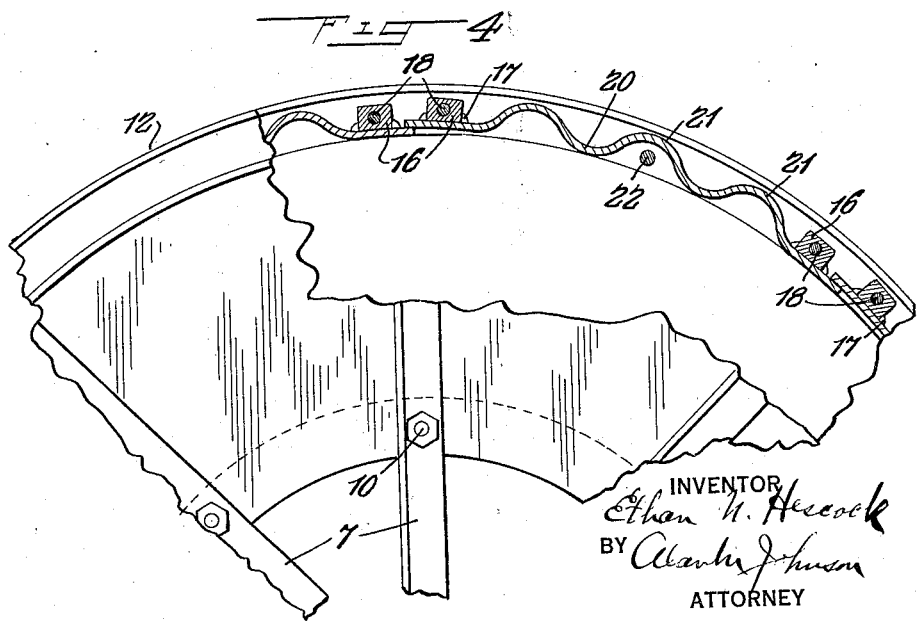
INVENTOR
Ethan N. Hescock
BY
ATTORNEY Patented May 17, 1932

1,858,825

UNITED STATES PATENT OFFICE

ETHAN N. HESCOCK, OF WESTFIELD, NEW JERSEY, ASSIGNOR TO HENRY B. NEWHALL CORPORATION, OF GARWOOD, NEW JERSEY, A CORPORATION OF NEW JERSEY

CABLE REEL AND METAL LAGGING

Application filed May 2, 1930. Serial No. 449,228.

My invention relates to strong metal reels for heavy cable, heavy wire, wire rope, or similar material, and to metal lagging used to protect the contents of the metal reel.

My invention further relates to combinations, subcombinations, articles of manufacture, and details of construction, which will be more fully hereinafter described in the specification and pointed out in the claims.

In the accompanying drawings showing an illustrative embodiment of my invention, and in which the same reference numerals refer to similar parts in the several figures:—

Figure 1 is a side elevation, partly broken away for purposes of illustration.

Figure 2 is a cross section on line 2—2 of Figure 1, on an enlarged scale.

Figure 3 is a section on line 3—3 of Figure 1, on an enlarged scale.

Figure 4 is a fragmentary side elevation, partly broken away, illustrating a modified form of metal lagging.

Cable reels are used to hold heavy lead covered cable, heavy wire, wire rope, or other heavy material which can be wound upon the drum reels at the place of manufacture, and then the loaded cable reel is transported, in any suitable manner, to the location where the cable, wire, wire rope, or other material is to be used. To wind and unwind the cable, or other material from the reel, the reel is jacked up and temporarily supported so that it may rotate on a temporary axle passed through the hubs of the heads. For short distances, to get the cable reel into its proper position, it is sometimes customary to use the heads of the reel as wheels.

Necessarily, these cable reels have to be very large and very strong to withstand the tremendous load and the rough handling to which they are subjected.

At the same time the contents of the reels must be protected from abrasion, blows, or any distortion, which, in a lead covered cable, may injure the insulation on the wires forming the cable and render the cable valueless.

In the present practice of shipping lead covered cable, heavy wire, wire rope, or similar material on a wood reel the outer coil is protected by wood strips known as lagging. These wood strips are expensive as many are lost in transit, others are purloined for fire wood while others split and are rendered useless. Then, too, the labor cost of removing them from the reel, and later removing the nails from the wood lagging, preparatory to again using the lagging when the reel is again loaded, is excessive.

In metal reels for shipping lead covered cable, heavy wire, wire rope, and similar heavy material, the load is so great that any excessively rough handling, as for example by letting the reel accidentally fall from a support, or from its temporary axle, or from a truck, or from a freight car, or similar accident, will often cause the periphery of the different sides, or heads as they are called in the trade, to be either separated or forced together.

If the peripheries of the heads are forced together, it is difficult to remove the wood lagging to unwind the cable on the job because it will have been wedged in place.

If, on the other hand, the periphery of one or both heads forming the reel, are forced apart by accidents, such as above described, or similar ones, the lagging will drop out, exposing the cable or other material wound upon it.

My invention relates more particularly to a cable reel for such heavy material, which, even if one or both of the heads are sprung, either inward or outward, will not interfere with either removing the lagging, to unwind the cable on the job; or, in placing the lagging on the reel at the place of manufacture of the cable or similar material.

Moreover, my lagging serves as a brace from one head to the other, and will assist, somewhat, in preventing any distortion of the peripheries of the heads.

In the embodiment of my invention shown in the drawings 1 is a metal reel formed of two heads 2 and 3. The periphery of the heads is, in the form shown, formed by bending an I-beam to form a ring, the ends being welded together at 4. The I-beams become the rims or felloes 12, 12 of the completed reel 1. The circular grooves of the I-beam become lagging grooves 5, 5. The two heads 2 and 3 are formed in any suitable manner such as by the angle iron spokes 7, 7, of each head being connected with their own hub 8 by welding or otherwise. A drum 9 is secured between the heads 2 and 3 in any suitable manner, such as by the through bolts 10, 10. Side plates 11 are also preferably secured to the spokes 7, 7 by welding or otherwise and to the rim or felloe 12, in any suitable manner, as by peening down the ends 13, 13 of the arcuate side plates 7.

Within the lagging grooves 5, 5 of the rims or felloes 12, 12 I mount my improved metal lagging. This lagging is preferably in arcuate sections 15, 15. I provide the lagging with adjustable means to adjustably secure it in the lagging grooves 5, 5, or other co-operating part of the reel, if the reel should not be formed with such grooves.

In the embodiment shown, by way of example, but to which my invention is not to be limited, except as limited by my claims, I secure screw-threaded blocks 16, 16, by welding 17 or otherwise, so that these blocks are firmly and immovably secured to the lagging, one block preferably being secured to each side of the lagging. Screw bolts 18, 18 are mounted, one in each block.

It is clear that when the bolts 18, 18 are screwed back from the lagging grooves 5, 5 the effective width of the lagging is reduced, and as they are screwed out the effective width of the lagging is increased. This permits the ready insertion of the metal lagging 15 in the lagging grooves 5, 5 and the securing of them in position by screwing up on the bolts 18, 18, until the ends 19, 19 engage, more or less firmly, with the felloes or rims 12, 12 of each heads 2 and 3.

Should the reel accidentally fall off a freight car or truck, or fall from its temporary axle, or otherwise be subjected to excessive strain, my metal lagging 15, 15 engaging around the entire periphery of the reel will tend to transmit any blow on one head or felloe to the other, and in this way act, somewhat, as a brace, as well as a lagging.

Should, however, the rims or felloes 12, 12 in the course of time become somewhat bent and untrue, the bolts 18, 18 can readily be adjusted to compensate for any such irregularity. Should the reel be subjected to such a strain as to bend both rims or felloes 12, 12 inward, more or less, my lagging nevertheless can readily be removed by unscrewing the bolts 18, 18 so that the cable, or other material on the drum 9, may be readily unwound at the place of consumption.

In some cases I form my metal lagging 20 with corrugations 21, 21 Figure 4. These corrugations are of less height than the distance between the flanges 25, 25 forming the peripheral lagging grooves 5, 5.

In use I preferably locate one end of my metal lagging over the end of the adjacent metal lagging as shown in Figures 1 and 4, though, of course, this overlapping may be dispensed with.

In some cases to prevent distortion or bending of the rims or felloes 12, 12 I may employ through strengthening rods 22, Figure 2. If used, and their use is entirely optional, I preferably employ four such strengthening rods as shown in Figures 1 and 2 to connect the rim or felloes of the different heads.

Having thus described my invention in connection with an illustrative embodiment thereof, to the details of which I do not desire to be limited, what is claimed as new and what is desired to secure by Letters Patent is set forth in the appended claims.

What I claim is:

1. A new article of manufacture comprising a cable reel provided with adjustable lagging to protect the material wound on the cable reel, and means to adjust the lagging in the axial direction of the reel to adjustably secure the lagging to the reel.

2. The combination of cable reel provided with co-operating surfaces to removably receive lagging, removable metal lagging adapted to co-operate with said surfaces, and means to adjust the lagging in the axial direction of the reel to removably secure the lagging in place.

3. The combination of a cable reel provided with peripheral lagging grooves, removable metal lagging adapted to fit into said grooves, and adjustable means to compensate for any irregularity in the grooves.

4. The combination of a cable reel provided with peripheral lagging grooves, removable metal lagging adapted to fit into said grooves, adjustable means to compensate for any irregularity in the grooves, and one or more tie bolts connecting the felloes or rims of the reel.

5. The combination of a cable reel provided with peripheral lagging grooves, removable metal lagging adapted to fit into said grooves, and adjusting bolts carried by the metal lagging adapted to contact with the lagging grooves to compensate for any irregularity in the grooves.

6. A new article of manufacture comprising metal lagging adapted to protect the contents of a metal reel, the metal lagging being provided with adjustable means to compensate for any irregularity in the metal reel with which it co-operates.

7. A new article of manufacture comprising arcuate metal lagging adapted to protect the contents of a metal reel, the arcuate metal lagging being provided with adjustable means to compensate for any irregularity in the metal reel with which it co-operates.

8. The combination in a cable reel having peripheral lagging grooves, of a plurality of arcuate metal lagging, one arcuate metal lagging overlapping the adjacent arcuate metal lagging, and means to adjust the arcuate metal lagging in said peripheral lagging grooves in the axial direction of the reel.

9. A new article of manufacture comprising metal lagging for a cable reel, comprising a plurality of unconnected arcuate sheet metal strips each strip adapted to be independently applied to a cable reel and each strip provided with adjustable means to vary its effective width.

10. A new article of manufacture comprising metal lagging for a cable reel, comprising a plurality of unconnected arcuate sheet metal strips each strip adapted to be independently applied to a cable reel and each corrugated strip provided with adjustable means to vary its effective width.

ETHAN N. HESCOCK.